(12) United States Patent
Han et al.

(10) Patent No.: US 6,576,216 B2
(45) Date of Patent: Jun. 10, 2003

(54) METHOD OF MANUFACTURING LITHIUM-MANGANESE OXIDE FOR USE IN LITHIUM SECONDARY BATTERY

(75) Inventors: Yi Sup Han, Daejeon Kwangyeok-si (KR); Ho Gi Kim, Seoul (KR); Kyu Sung Park, Kwangyeok-si (KR)

(73) Assignee: Korea Advanced Institute of Science &Technology, Kwangyeok-Si (KR)

( * ) Notice: Subject to any disclaimer, the term of this patent is extended or adjusted under 35 U.S.C. 154(b) by 0 days.

(21) Appl. No.: 09/756,205

(22) Filed: Jan. 9, 2001

(65) Prior Publication Data

US 2002/0090553 A1 Jul. 11, 2002

(30) Foreign Application Priority Data

Nov. 23, 2000 (KR) ............................. 2000-69823

(51) Int. Cl.⁷ .................................................. C01G 45/00
(52) U.S. Cl. ......................................... 423/599; 429/224
(58) Field of Search ........................ 423/599; 429/224

(56) References Cited

U.S. PATENT DOCUMENTS 6,071,489 A * 6/2000 Sun et al. .................... 423/594
6,083,643 A * 7/2000 Cho et al. .................... 423/599

* cited by examiner

Primary Examiner—Steven Bos
(74) Attorney, Agent, or Firm—Rosenberg, Klein & Lee

(57) ABSTRACT

A method for manufacturing lithium-manganese oxide powders for use in a lithium secondary battery is provided. The method includes the steps of dissolving in nitric acid a composition selected from the group consisting of: manganese oxide, manganese carbonate, or manganese to form a manganese solution, and then dissolving in the manganese solution a composition selected from the group consisting of lithium carbonate, lithium hydroxide, or lithium acetate. Glycine is added to the mixed metal solution and the mixed metal solution is dried in a vacuum dryer to form a combustible resin. The combustible resin is then ignited at room temperature and the combusted products are calcined.

5 Claims, 2 Drawing Sheets

METHOD OF MANUFACTURING LITHIUM-MANGANESE OXIDE FOR USE IN LITHIUM SECONDARY BATTERY

BACKGROUND OF THE INVENTION

1. Field of the Invention

The present invention relates to a method for manufacturing lithium-manganese (Li—Mn) oxides which are used for a positive electrode material of Li secondary battery, and more particularly, to a method for manufacturing Li—Mn oxide powders, in which a battery having a high productivity, a large capacity, and a long life cycle is obtained, since powders having an excellent crystallization can be produced by heat-treating for a considerably shorter time than those of conventional methods.

2. Description of the Related Art

In general, there are two technical matters to be solved in relation to a capacity and a lifetime of a Li secondary battery.

Firstly, a state transition phenomenon occurring in the process of charging and discharging a battery may reduce a capacity and lifetime of the Li secondary battery. In the case that a Li secondary battery is charged, lithium (Li) existing in $Li_xMn_2O_4$ (x=1) powders being a positive electrode material is extracted and dissolved in an electrolyte, and the dissolved lithium ions are moved to carbon or graphite being a negative electrode. Meanwhile, in the case that the Li secondary battery is discharged, lithium is separated from carbon and inserted into a crystalline lattice of the $LiMn_2O_4$ powders again. Here, in the case that x>0.5 in $Li_xMn_2O_4$, lithium exists as a single phase in which a lithium content is successively varied, so that a crystalline structure is continuously varied at the process of inserting and extracting lithium. However, in the case that x<0.5 in $Li_xMn_2O_4$, a lithium content is separated into two different states, that is, $\lambda$-$MnO_2$ (x=0) and $Li_{0.5}Mn_2O_4$ (x=0.5). As a result, the lithium insertion and extraction process accompanies a state transition of $\lambda$-$MnO_2$ and $Li_{0.5}Mn_2O_4$, to thereby cause the crystalline structure to be severely varied. In this process, since a part of structure in the lattice of the $LiMn_2O_4$ powders is destroyed at the time of insertion and extraction of lithium, or $Mn^{+3}$ ions are dissolved into the electrolyte, a lifetime of the positive electrode is lowered.

It has been found that the above problem cannot be solved by altering conventional processes. That is, both a solid-state reaction method and a sol-gel method reveal the above phenomenon. In order to prevent the lifetime of the positive electrode from being shortened, it is the most essential method to substitute an ion (or ions) such as $Li^+$, $Co^{+2}$, $Cu^{+2}$ and $Ni^{+2}$ whose oxidation number is lower than that of manganese into a manganese position. However, in this case, a $Mn^{+3}$ ion concentration decreases by valence of the substituted ion and thus the number of the ions which can be participated in the $Mn^{+3} \longleftrightarrow Mn^{+4}$ transition becomes small. As a result, a theoretical capacity of a battery decreases as many as the number of the state transition ions decreases. Therefore, it has been recognized that a somewhat reduction in capacity is inevitable in order to improve lifetime of a battery.

Secondly, nano-scale impurities of $Mn_2O_3$ and $Li_2MnO_2$ which are not found by an X-ray diffraction (XRD) method or an electron microscope, remain in a material at the manufacturing process, which impurities cause lowering of the lifetime during use. Finally, it is the key technique in producing powders having no foreign matter and an excellent crystallization.

Conventionally, for this reason, a solid-state reaction method or a sol-gel method has been used in order to produce the large amounts of powders having no foreign matter and an excellent crystallization. In the case of the solid state reaction method, $LiCO_3$ or $LiOH.H_2O$ and $MnO_2$ are well mixed and maintained for 150 hours at 400° C. or so, and then maintained again for 24 hours or more at 750° C., in order to enhance crystallization. This conventional solid-state reaction method gives an excellent crystallization but requires a long thermal treatment time, to accordingly cause the larger particle size. Thus, it is difficult to use it at the high current condition.

A sol-gel method is mostly used in order to obtain powders having uniform fine particles. Among various sol-gel methods, a method proposed in the Korean Patent Application No. 2000-5210 by the same inventor of this invention is most excellent. This method uses citric acid and ethylene glycol in order to make metal ions uniformly distributed. Here, spontaneous combustion occurs in the manufacturing process and thus crystallization occurs to a certain degree. As a result, although the thermal treatment time is shortened in this sol-gel method, the powders of the same property as that of the powders produced by the solid-state reaction method are obtained.

If the above impurities such as $Mn_2O_3$ and $Li_2MnO_2$ are removed to a further lower level, it is expected that we can obtain powders having a more excellent property. However, for this purpose, the content of ethylene glycol should be increased considerably. In this case, the ethylene glycol, volatilized during vacuum drying, is condensed on the inner wall of a vacuum line to thereby block the hose. Thus, the vacuum line should be cleaned regularly, to accordingly shorten a facility running time and increase a maintenance fee. Furthermore, since lithium ions are volatilized in a fashion combined with the ethylene glycol, the composition of the powders is not maintained uniformly unless a vacuum drying process is carefully controlled, to accordingly cause a non-uniform property.

SUMMARY OF THE INVENTION

To solve the above problems of a conventional solid-state reaction method or a combustion synthesis method, it is an object of the present invention to provide a method for manufacturing a Li—Mn oxide in which glycine is used instead of citric acid and ethylene glycol which are used in a combustion synthesis process and an amount of nitric acid is adjusted.

It is another object to provide a method for easily synthesizing fine $LiMn_2O_4$ powders having an excellent crystallization, industrially.

To accomplish the above object of the present invention, there is provided a method for manufacturing $LiMn_2O_4$ powders for use in a lithium secondary battery positive electrode, characterized in that oxide or carbonate is dissolved in a nitric acid solution, a spontaneous combustion is performed using glycine, and then the resulting matter is put into a reaction furnace in order to calcine that for a short time.

BRIEF DESCRIPTION OF THE DRAWINGS

The objects and other advantages of the present invention will become more apparent by describing in detail the structures and operations of the present invention with reference to the accompanying drawings, in which.

DETAILED DESCRIPTION OF THE EMBODIMENTS

Figure 1:
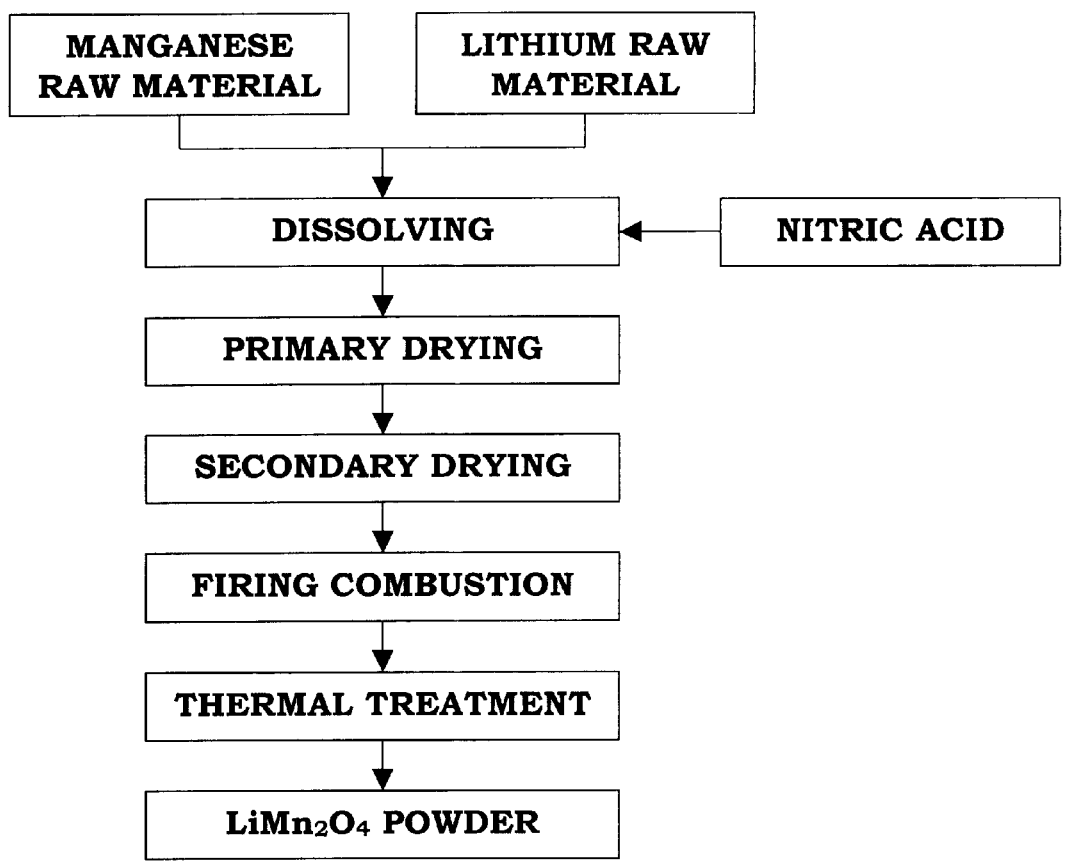
FIG. 1 is a flowchart showing a manufacturing process applied in the present invention.

Preferred embodiments of the present invention will be described in more detail with reference to the accompanying drawings. However, the present invention is not limited to these embodiments.

Metal salt materials for use in a positive electrode material which is appropriate for embodiment of the present invention is oxide, carbonate, hydrate or pure metal, at least one of which does not absorb moisture in the air. For example, in the case of manganese, $MnO_2$, $Mn_3O_4$, $Mn_2O_3$, $MnCO_3$ or manganese metal can be used. In the case of lithium as a negative component, $LiCO_3$, $LiOH.H_2O$ or lithium acetate is appropriate for embodiment of the present invention.

Manganese is completely dissolved in nitric acid as a solvent, in which lithium prepared so that a composition ratio with respect to manganese meets a predetermined ratio is completely dissolved, to thereby produce a metal salt solution. By doing so, a chemical quantitative composition can be simplified as described in the prior art description of the present invention.

Here, it is preferable to add a hydrogen peroxide solution a little until $MnO_2$ is perfectly dissolved in the case that $MnO_2$ is used. It is preferable that the nitric acid used as a solvent is 0.5 M/L to 3 M/L in concentration. If the concentration of nitric acid is too low, a time required for dissolving lithium or manganese become too long. Meanwhile, if the concentration thereof is too high, the amount of solution is too little. Thus the glycine is not well dissolved undesirably.

Also, it is preferable that a total amount of nitric acid in the nitric acid solution is 1 to 3 moles with respect to total metal moles. If an amount of nitric acid used is too small, no more lithium or manganese is dissolved. If an amount thereof is too large, an amount of water becomes large, which causes a too long time to dry the solution undesirably.

Here, it is preferable that a ratio of lithium and manganese, that is, 2 Li/Mn is 0.95 to 2.00. If the above ratio is less than 0.95, a lithium content becomes deficient, to thereby reduce a battery capacity greatly. If the above ratio is larger than 2.00, a crystalline state having no electrochemical activity is produced undesirably.

After manufacturing the metal salt solution by the above process, an appropriate amount of glycine is put into the solution and then dissolved perfectly, in order to obtain fine oxide powders, thereby preparing a metal salt solution for use in a positive electrode material.

It is preferable that glycine is 1.0 to 3.5 moles with respect to total metal moles. If glycine is less than 1.00 moles, the crystal of $LiNO_3$ or $Mn(NO_3)_2.xH_2O$ is precipitated in the process of drying the metal salt solution. As a result, a uniform reactive matter cannot be obtained. Or since a reaction rate is too fast, a too rapid combustion reaction occurs and explodes, to thereby cause a safety problem. Also, in the case that the amount of glycine exceeds 3.5 moles, a combustion reaction rate is too slow. It may cause an undesirable result.

In the method for manufacturing powders of a positive electrode material for use in a lithium secondary battery, the metal salt solution obtained above is heated at 150–200° C. to be made in the form of wax, and then a spontaneous ignition and combustion is performed in the air. In the process of forming the wax, the metal salt solution is dried in a vacuum drier at least one time at 70–95° C., to thereby perfectly remove the moisture. The moisture-removed wax suppresses an irregular combustion during the spontaneous combustion process. The vacuum drying temperature lower than 70° C. lengthens a drying time and the temperature higher than 95° C. can cause the wax to be decomposed in advance prior to performing a combustion reaction. Furthermore, the lithium is evaporated during decomposition of wax. It is undesirable to control the stoichiometric composition. However, the temperature in the range of 70–95° C. is appropriate and enough for the final property without any limitation.

Although there is no additional external energy supply, the auto-ignition process enables combustion of an organic matter, once if a certain reaction has been performed, also a crystalline state of a considerable level is formed by heat produced during burning of the wax. Additionally, a uniform combustion reaction is obtained even at the state that a rapid reaction is suppressed. Thus, there is no problem in industrial safety matter.

The auto-ignition process can be performed by firing a wax-formed metal salt mixture with a conventional method, e.g. using a lighter or match, or by heating it at 200° C. or so until a firing reaction occurs. There is no particular limitation in the auto-ignition process. Once a firing occurs, the ignition exceeds even though heating is interrupted.

The ignited powder obtained through the auto-ignition process is put into a furnace and thermally treated for a predetermined time. Then, the lithium manganese oxide powders according to the present invention are manufactured.

The present invention uses glycine differently from the conventional method, which uses citric acid and ethylene glycol. Thus, since the ethylene glycol is not volatilized at the vacuum drying process, a maintenance fee can be saved. Furthermore, as long as a vacuum drying temperature remains in a predetermined temperature range, although the process is not accurately controlled, a chemical quantitative control can be easily performed since lithium is not volatile. Thus, a more uniform metal salt mixture can be obtained, to thereby obtain powders having more enhanced properties.

The present invention can use a transition metal, for example, Co, V, Ni, Cr, Cu, Ti or Zn or metal having valence of +1, +2 or +3, for example, Li, Al or Sn, which is substituted for a part of manganese, other than manganese.

The present invention will be described in more detail through the preferred examples of the present invention. However, the present invention is not limited to these examples.

EXAMPLES 1 through 8

$MnO_2$ of 1 mole is put in a nitric acid solution of 2 M and then stirred. A hydrogen peroxide solution is put little by little until the $MnO_2$ is completely dissolved. Then, $Li_2CO3$ of 0.5 mole is put and stirred. After completely dissolving $Li_2CO_3$, glycine of 1.0 mole (Examples 1 and 7), 1.5 moles (Example 3 and 8), 2 moles (Example 3), 2.5 moles (Example 4), 3.0 moles (Example 5 and Examples 9–14) and 3.5 moles (Example 6) with respect to total metal moles is put and stirred continuously until the glycine is completely dissolved.

The mixed solution is heated on a heating plate at 150–200° C. and heated for one to two hours. After moisture has been distilled to a certain degree and if a solidified product starts to be produced on the surface of the solution, the mixed solution is put into a vacuum drier maintained at 80° C. and dried until moisture is completely distilled. The dried product is taken out and then properly pulverized, Thereafter, the pulverized product is heated until it is auto-ignited on the heating plate of about 200° C. (Examples 1–6) or is contained in a stainless steel vessel and then auto-ignition initiated with a lighter flame (Examples 7 and 8). The following Table 1 illustrates a yield of powders produced of each example with an amount of glycine addition.

TABLE 1

The amount glycine addition of each Example and yield of the produced powders.

| Examples | Nitric acid/metal | Glycine/metal | Firing method | Yield |
|---|---|---|---|---|
| 1 | 5/3 | 1.0 | Hot plate, 200° C. | 5% or less |
| 2 | 5/3 | 1.5 | Hot plate, 200° C. | 5% or less |
| 3 | 5/3 | 2.0 | Hot plate, 200° C. | 50% or more |
| 4 | 5/3 | 2.5 | Hot plate, 200° C. | 80% or more |
| 5 | 5/3 | 3.0 | Hot plate, 200° C. | 90% or more |
| 6 | 5/3 | 3.5 | Hot plate, 200° C. | 90% or more |
| 7 | 5/3 | 1.0 | Lighter | 90% or more |
| 8 | 5/3 | 1.5 | Lighter | 90% or more |
| 9 | 5.75/3 | 3.0 | Hot plate, 200° C. | 90% or more |
| 10 | 5.84/3 | 3.0 | Hot plate, 200° C. | 90% or more |
| 11 | 6.50/3 | 3.0 | Hot plate, 200° C. | 90% or more |
| 12 | 7.25/3 | 3.0 | Hot plate, 200° C. | 90% or more |
| 13 | 8.00/3 | 3.0 | Hot plate, 200° C. | 90% or more |

As can be seen from Table 1, if glycine content is small, a reaction rate is too fast and the reaction explosively occurs. Thus, a yield of the powders is undesirably small. In this case, since a firing reaction occurs with a lighter, the yield can be increased as in Examples 7 and 8.

EXAMPLES 9 through 13

A combustion synthesis reaction product manufactured in the Examples 1–8 methods with a metal salt solution, which is manufactured with various values of metal/nitric acid/glycine ratio and various amounts of metal substitution, is heated at a rate of 3° C. per minute in air atmosphere, and maintained at 800° C. for four hours. Then, the temperature is cooled down to 600° C. at a rate of 1° C. per minute and thereafter cooled down at a rate of 10° C. per minute, to thereby synthesize a LiMn$_2$O$_4$ single phase is obtained.

Figure 2:
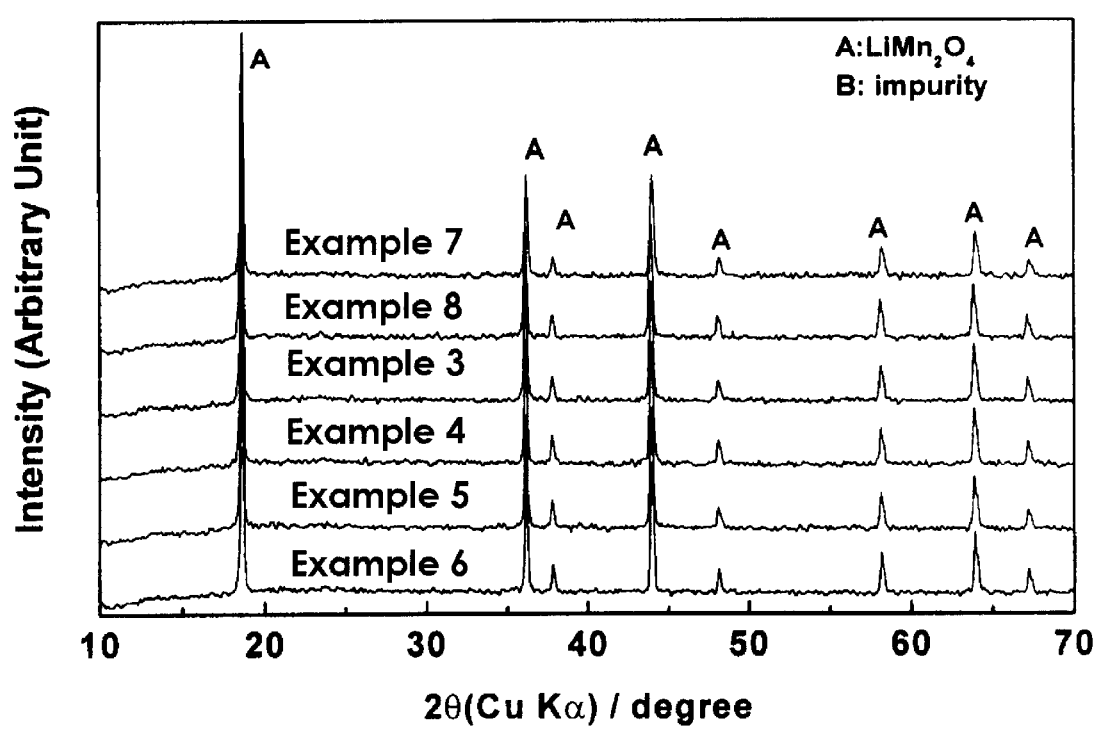
FIG. 2 is an X-ray diffraction graphical view showing crystalline states of lithium-manganese oxide powders for use in a lithium secondary battery manufactured by the present invention.

FIG. 2 shows a crystalline state of the powders produced as above. As shown in FIG. 2, it can be seen that a LiMn$_2$O$_4$ crystal has been well developed without any impurity phases.

Comparative Examples 1 and 4

In order to ascertain the effect of the present invention, citric acid and ethylene glycol used in the conventional method have been used instead of glycine, and the amount of ethylene glycol and metal substitution has been varied, to thereby produce combustion synthesis powders. Then, the combustion synthesis powders are thermally treated in the same method of the Examples 9–13, to synthesize a LiMn$_2$O$_4$ single phase.

In order to measure battery characteristics of the positive electrode powders manufactured in the Examples 1–13 and the Comparative Examples 1–4, a composite electrode has been manufactured. A combining agent of 10 wt % and a conductive material such as carbon black of 10 wt % with respect to the positive electrode powders have been put and dissolved with a proper amount of a solvent and then mixed well in a rotary mixer. The thus-produced slurry is well spread and pasted on a SUS-316 stainless steel net, and dried in a vacuum drier maintained at 120° C. for one or more hours, to thereby produce a positive composite electrode. The positive composite electrode, a 99.9% Li-foil of Foote Mineral Company and an electrolyte of a 1 M LiClO$_4$-PC which has been premixed at Mitsubishi Chemical Company have been assembled with a sealing container in a dry box filled with argon (Ar) and then taken out, in order to prevent moisture from penetrating during measurement. A charging and discharging test has been performed using a potentiostat/galvanostat (model 263 or 273) of EG & G PARC. The charging and discharging test has been repeated at a cut-off voltage between 3.0–4.5 V under the current of 0.5 C rate.

The following Table 2 shows the initial discharging capacities of lithium secondary batteries and the capacity fading rates measured in the above method. Example 1 shows a battery characteristic similar to that of lithium excessive Li$_{1+x}$Mn$_{2-x}$O$_4$, which can be obtained by solid-state reaction method, thermally treating at 450° C. for 150 hours and thermally treating at 750° C. for 24 hours. In the present invention, although a total thermal treatment time is four hours, which is considerably shorter than that of the solid-state reaction method, it can be seen that a lithium-manganese oxide having a considerably stable characteristics can be obtained. This is the special feature of the combustion synthesis process because a crystalline phase has been developed to a considerable degree during the combustion reaction.

However, since the reaction time of combustion is considerably short and thus the crystalline phase is not well developed, a further performance improvement effect is not revealed. If a glycine content is increased (Examples 2–6 and 13), a reaction rate can be slowed down. As a result, an initial capacity and a capacity fading rate can be enhanced up to the degree which can be obtained in the conventional method using citric acid and ethylene glycol, to thereby provide a performance improvement effect. It can be seen from Examples 9–12 that the capacity fading rate can be enhanced up to the degree, which can be obtained in the Comparative Examples 1–4, and an initial capacity can be maintained up to a considerable degree, although a lithium content to be substituted for manganese is too small. Accordingly, this invention has more excellent merits than those of the conventional method.

TABLE 2

Characteristics of Li secondary battery of powders produced according to each Example and Comparative Example

| | Citric acid/ ethylene glycol | Substitution metal x (Li1MxMn2—xO4) | Initial capacity (mAhg$^{-1}$) | Capacity fading rate (%/cycle) |
|---|---|---|---|---|
| Example 1 | — | Li = 0.095 | 113.47 | 0.10 |
| Example 2 | — | Li = 0.041 | 129.50 | 0.55 |
| Example 3 | — | Li = 0.071 | 131.12 | 0.63 |
| Example 4 | — | Li = 0.058 | 123.53 | 0.63 |
| Example 5 | — | Li = 0.032 | 118.77 | 0.62 |
| Example 6 | — | Li = 0.076 | 119.63 | 0.62 |
| Example 9 | — | Li = 0.035 | 126.21 | 0.21 |
| Example 10 | — | Li = 0.55 | 131.76 | 0.12 |
| Example 11 | — | Li = 0.50 | 127.65 | 0.37 |
| Example 12 | — | Li = 0.55 | 127.86 | 0.20 |
| Example 13 | — | Li = 0.20 | 115.47 | 0.12 |
| Comp. Example 1 | ⅕ | Li = 0.20 | 115.47 | 0.12 |
| Comp. Example 2 | ⅕ | Li = 0.10 | 126.7 | 0.41 |
| Comp. Example 3 | ¼ | Cu = 0.05 | 123.3 | 0.23 |
| Comp. Example 4 | ¼ | Cu = 0.10 | 117.4 | 0.10 |

In the case of the lithium-manganese oxide powders for a lithium secondary battery manufactured according to the present invention, the crystallization can occur to a certain degree in the spontaneous combustion process. Accordingly, the present invention provides the excellent crystallization only with a thermal treatment for a short time, and there is no volatile material other than water in the vacuum drying process. Thus, the present invention has merits that the manufacturing facility can be maintained simply and the chemical quantitative composition can be easily controlled, and can improve the uniformity, in comparison with the conventional method. Therefore, the present invention provides a high capacity of charge/discharge and a long lifetime battery even under a high current condition.

The present invention can be applied to a lithium-manganeseoxide synthesis technology of substituting a part of manganese which is added as a general addictive material in order to increase a battery lifetime, by transition metals such as Co, V, Ni, Cr, Cu, Ti, or Zn, or metals having a ionic valence of +1, +2 or +3, such as Al, Li and Sn, as well as a pure lithium-manganese oxide synthesis technology composed of only lithium and manganese.

As described above, the present invention has been described according to preferred Examples. However, the present invention is not limited to the particularly preferred Examples. It is apparent to one skilled in the art that there are various modifications and variations without departing off from the spirit or the technical scope of the appended claims.

What is claimed is:

1. A method for manufacturing lithium-manganese oxide powders for use in a lithium secondary battery comprising the steps of:

(a) dissolving in nitric acid a material selected from the group consisting of manganese oxide, manganese carbonate, and manganese to form a manganese solution;

(b) dissolving in said manganese solution a material selected from the group consisting of lithium carbonate, lithium hydroxide, and lithium acetate wherein a 2 Li/Mn ratio is between 0.95–2.00 for forming a mixed metal solution;

(c) adding glycine to the mixed metal solution;

(d) drying the mixed metal solution of step (c) at a temperature of between 150° C.–200° C. in a vacuum dryer to form a combustible resin;

(e) combusting the combustible resin by ignition, said combustion forming combustion products; and, (f) thermally treating said combustion products obtained in step (e) to form said lithium-manganese oxide powders.

2. The method for manufacturing lithium-manganese oxide powders for use in a lithium secondary battery as recited in claim 1, wherein the molar content of the glycine is between 1–3.5 times the molar content of total metal ions.

3. The method for manufacturing lithium-manganese oxide powders for use in a lithium secondary battery as recited in claim 1, wherein the molar content of the nitric acid is between 1–3 times the molar content of total metals.

4. The method for manufacturing lithium-manganese oxide powders for use in a lithium secondary battery as recited in claim 1, wherein the combustion of step (e) is performed by ignition in air.

5. The method for manufacturing lithium-manganese oxide powders for use in a lithium secondary battery as recited in claim 1, wherein the step of thermally treating said combustion products is performed at a temperature of between 600° C.–800° C. in air in order to effect crystallization of said combustion products.

* * * * *